(12) United States Patent
Hooks

(10) Patent No.: US 8,332,455 B2
(45) Date of Patent: Dec. 11, 2012

(54) SIMULTANEOUS ANALYSIS OF MULTIPLE DATA SOURCES BY SYCHRONIZATION

(75) Inventor: Charles Gordon Hooks, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 3316 days.

(21) Appl. No.: 10/165,092

(22) Filed: Jun. 6, 2002

(65) Prior Publication Data

US 2003/0229663 A1    Dec. 11, 2003

(51) Int. Cl.
G06F 15/16    (2006.01)
(52) U.S. Cl. ......... 709/201; 709/202; 709/203; 709/205
(58) Field of Classification Search ................... 709/202, 709/203, 205, 232, 246, 201; 707/102, 2, 707/206, 999.2, 999.203, 999.206
See application file for complete search history.

(56) References Cited

U.S. PATENT DOCUMENTS

| | | | |
|---|---|---|---|
| 5,488,718 A | 1/1996 | Tanaka et al. | 395/600 |
| 5,920,285 A | 7/1999 | Benjamin | 342/368 |
| 6,111,710 A | 8/2000 | Feyh et al. | 360/46 |
| 6,205,419 B1 | 3/2001 | Fiedler | 704/201 |
| 6,292,803 B1 * | 9/2001 | Richardson et al. | 707/102 |
| 6,415,270 B1 * | 7/2002 | Rackson et al. | 705/36 R |
| 6,671,701 B1 * | 12/2003 | Chouinard | 707/201 |
| 6,847,983 B2 * | 1/2005 | Somalwar et al. | 707/203 |
| 7,269,516 B2 * | 9/2007 | Brunner et al. | 702/19 |
| 7,580,798 B2 * | 8/2009 | Brunner et al. | 702/19 |
| 7,882,135 B2 * | 2/2011 | Brunner et al. | 707/791 |
| 2002/0165817 A1 * | 11/2002 | Rackson et al. | 705/37 |
| 2004/0054542 A1 * | 3/2004 | Foote et al. | 704/500 |

* cited by examiner

Primary Examiner — Asad Nawaz
Assistant Examiner — Sargon Nano
(74) Attorney, Agent, or Firm — Yee & Associates, P.C.; Rudolf O. Siegesmund

(57) ABSTRACT

An apparatus and method is disclosed for processing of multiple sources of data in a single execution process to synchronize the data to be analyzed by multiple analysis routines. A control program is given the criteria for each of the analysis routines and then reads data from each source meeting the criteria, converting the data from each source to a common format, controlling the analysis routines for each source for time synchronization of the data from the multiple sources and executing each analysis routine in time order. Specifically the following subroutines are used: (1) a routine to read and process a set of controls to describe data by time and type for each analysis routine; (2) a routine to read and process a set of controls to describe the sources of input; (3) a routine for reading data from each of the sources of input a record at a time, deciding whether the time and type for the record is requested for the current analysis, and if not, reading another record or, if so, setting up to process and return the current time and type of record for the source in a common format; and (4) a routine to decide which time from the current record for each source is the earliest and then execute the appropriate analysis by type of data requested for that source record by calling the appropriate analysis routine.

20 Claims, 4 Drawing Sheets

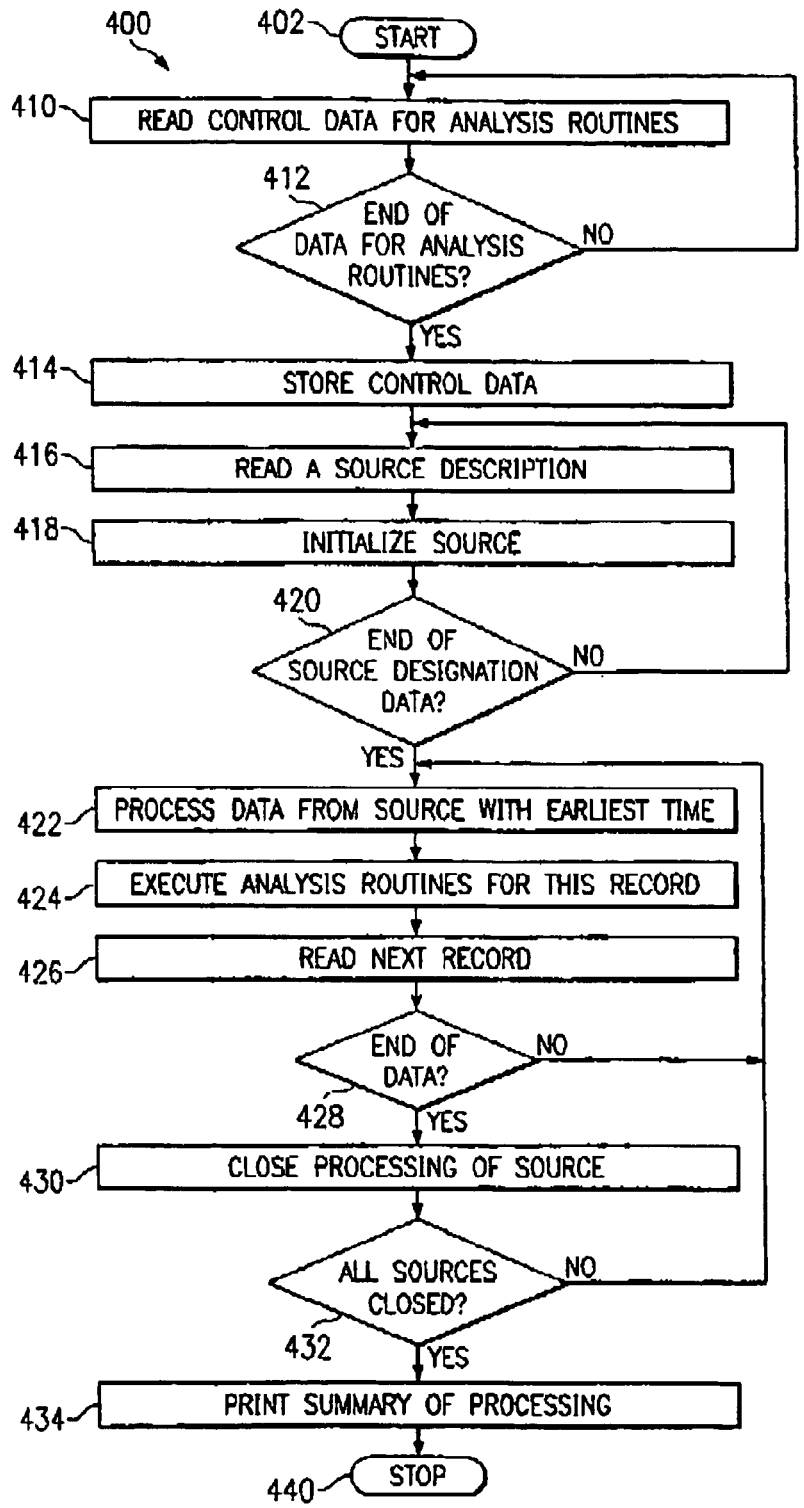

SIMULTANEOUS ANALYSIS OF MULTIPLE DATA SOURCES BY SYCHRONIZATION

FIELD OF THE INVENTION

The present invention relates in general to data manipulation software for computers and specifically to a process for reducing the time necessary to process data through multiple analysis routines.

BACKGROUND OF THE INVENTION

When analyzing a system involving a simulation or production operation, the normal procedure is to write multiple sets of data on various recording media. Analysis is then performed on the media or data sources separately. The multiple analysis routines have to be executed against the data in time order from the various sources. In addition, the multiple analysis routines have to be able to select which source was to be used depending on the type of analysis. The results of the separate analysis are then combined for the total analysis of the system. As the systems to be analyzed have become more and more complex, the tasks of combining the results has become more and more time consuming. Therefore, a need exists for an apparatus and method to provide a means for performing a complete analysis in a single execution process.

SUMMARY OF THE INVENTION

The invention which provides for the processing of multiple sources of data in a single execution process is an apparatus and method to synchronize the data to be analyzed by multiple analysis routines through a control program that is given the criteria for each of the analysis routines and then reads data from each source meeting the criteria, converting the data from each source to a common format, controlling the analysis routines for each source for time synchronization of the data from the multiple sources and executing each analysis routine in time order. Specifically the following subroutines are used: (1) a routine to read and process a set of controls to describe data by time and type for each analysis routine; (2) a routine to read and process a set of controls to describe the sources of input; (3) a routine for reading data from each of the sources of input a record at a time, deciding whether the time and type for the record is requested for the current analysis, and if not, reading another record or, if so, setting up to process and return the current time and type of record for the source in a common format; and (4) a routine to decide which time from the current record for each source is the earliest and then execute the appropriate analysis by type of data requested for that source record by calling the appropriate analysis routine.

BRIEF DESCRIPTION OF THE DRAWINGS

FIG. 4 is a flow chart of the synchronization program;

DETAILED DESCRIPTION OF THE PREFERRED EMBODIMENT

Figure 1:
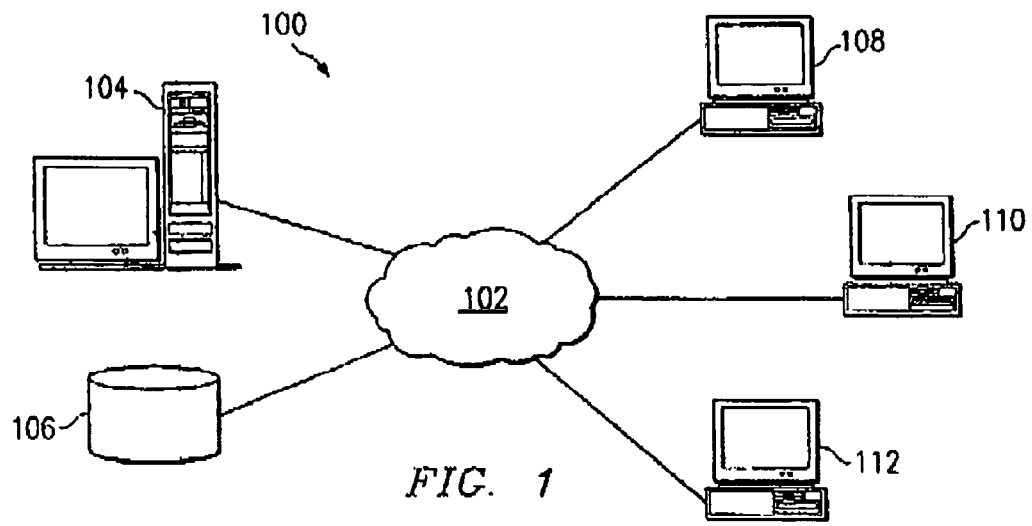
FIG. 1 is a depiction of a network in which the invention may be implemented.

FIG. 1 depicts a pictorial representation of a distributed data processing system in which the present invention may be implemented and is intended as an example, and not as an architectural limitation, for the processes of the present invention. Distributed data processing system 100 is a network of computers which contains a network 102, which is the medium used to provide communication links between the various devices and computers connected together within distributed data processing system 100. Network 102 may include permanent connections, such as wire or fiber optic cables, or temporary connections made through telephone connections. In the depicted example, a server 104 is connected to network 102 along with storage unit 106. In addition, clients 108, 110, and 112 also are connected to a network 102. Clients 108, 110, and 112 may be, for example, personal computers or network computers.

For purposes of this application, a network computer is any computer, coupled to a ID network, which receives a program or other application from another computer coupled to the network. In the depicted example, server 104 provides Web based applications to clients 108, 110, and 112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as, an intranet, a local area network (LAN), or a wide area network (WAN).

Figure 2:
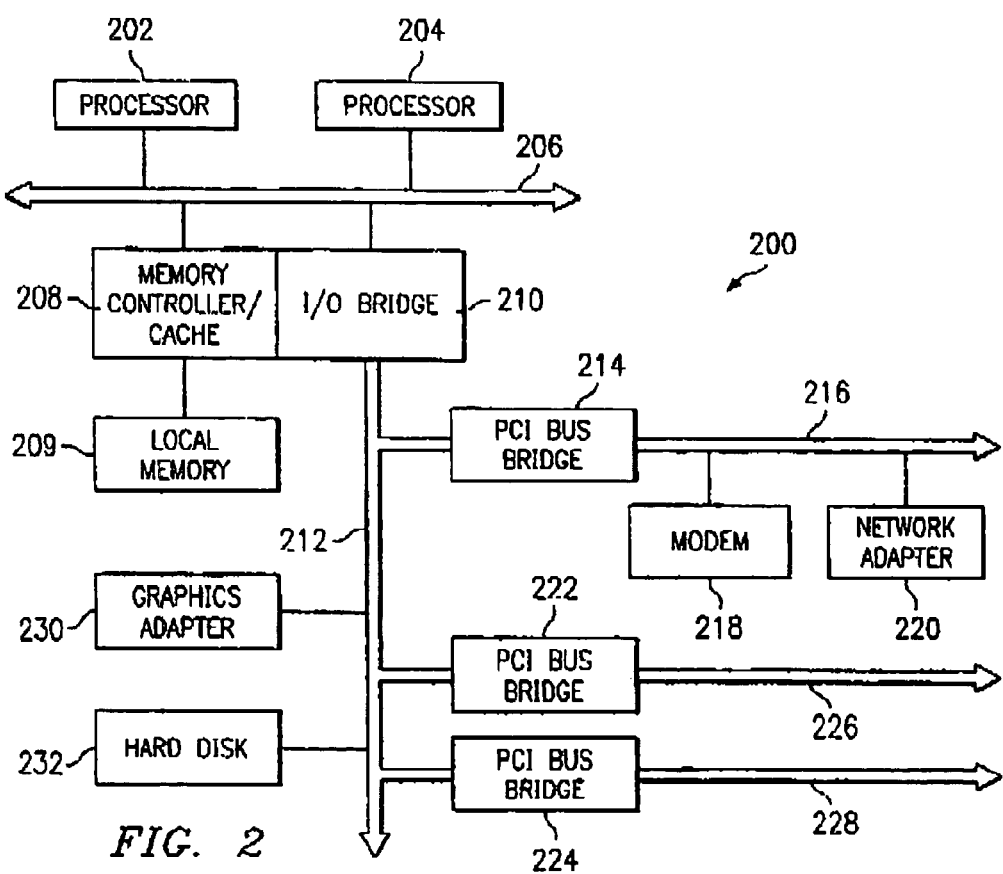
FIG. 2 depicts a client computer in which the invention may be implemented.

Referring to FIG. 2, a block diagram depicts a data processing system, which may be implemented as a server, such as server 104 in FIG. 1 in accordance with the present invention. Data processing system 200 may be a symmetric multiprocessor (SMP) system including a plurality of processors such as first processor 202 and second processor 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to first PCI local bus 216. Modem 218 may be connected to first PCI bus local 216. Typical PCI bus implementations will support four PCI expansion slots or add-in connectors. Communications links to network computers 108, 110 and 112 in FIG. 1 may be provided through modem 218 and network adapter 220 connected to first PCI local bus 216 through add-in boards. Additional PCI bus bridges such as second PCI bus bridge 222 and third PCI bus bridge 224 provide interfaces for additional PCI local buses such as second PCI local bus 226 and third PCI local bus 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as an optical disk drive and the like also may be used in addition or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
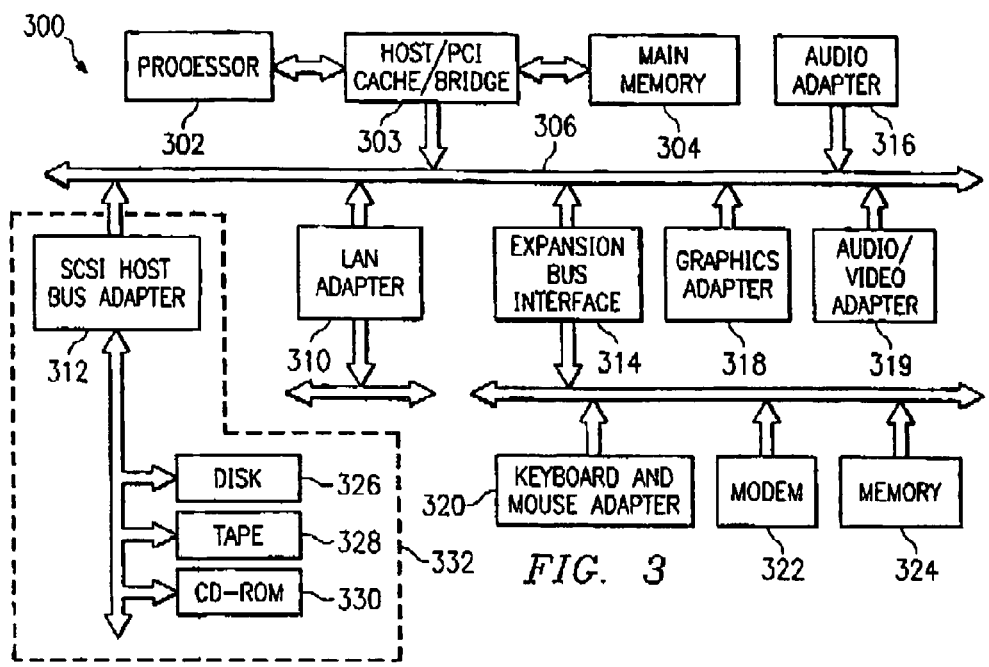
FIG. 3 depicts a server computer in which the invention may be implemented.

With reference now to FIG. 3, a block diagram illustrates a data processing system in which the invention may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 303. PCI bridge 303 also may include an integrated memory controller and cache memory for Processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Incorporated. Instructions for the operating system, the object-oriented operating system, and applications or programs may be located on storage devices, such as hard disk drive 326, and they may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data. The depicted example in FIG. 3 and above-described examples are not meant to imply architectural limitations with respect to the present invention. It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disc, a hard disk drive, a RAM, and CD-ROMs, and transmission-type media, such as digital and analog communications links.

FIG. 4 depicts the flow of processing of Synchronization Process (SP) 400. SP 400 starts (402) and a data request is input for each for each kind of the various analyses to be performed (410). The data request describes the time interval and the type of data for each analysis function. Each record in a source has several types of data for each time value. A determination is made as to whether or not all data requests have been processed (412). If all data requests have not been processed, the SP 400 goes to step 410. If all data request have been processed, SP 400 goes to step 414 and data is stored to control processing (414). When all requests are processed, the data is set up for overall controlling of the processing of each source by making a list of all time intervals requested for each source and all the unique types of data requested for each source. This data is used to examine each record as the record is read from the source for immediately skipping the record if the time or type of data is not requested.

A source description is read (416). The source description provides SP 400 with the information to determine which analysis routine will be used to process the source. Each source of data must have a read routine supplied that is tied to the format of that source. There may be several sources of the same type to be processed for a given analysis. Next, processing of the source is initialized (418). The source is initialized by reading records until the first time value is reached as specified by the data requests. The type of data is also checked to ensure that it is of a type being requested for the analysis. Therefore, the source is positioned at the first usable record.

A determination is made as to whether or not all source descriptions have been processed (420). If all source descriptions have not been processed, then SP 400 goes to step 416 to read the next source description. Next, data from the source with the earliest time value is processed (422). The source with the earliest time value is processed by placing the requested data in a common format for use by an analysis function. The common format is key to being able to provide source data to analysis function(s). By using a set format that is a single parameter containing all of the data requested at a time value each analysis function is able to be written to easily interface with the data. In addition, the common format contains the time of the data and the specific type of data found. Therefore, the analysis function can decypher the data and proceed with the analysis.

Next, analysis routines that requested the data are executed (424). The next record(s) of the source just used is read until another record is found that meets the time intervals and type of the various requests. The record is added to the time ordered list for processing (426). A determination is made as to whether or not there is more data (428). The determination as to whether or not there is more data is made by determining if the source is complete and whether or not there are more records from that source to be processed. If not, then SP 400 goes to step 422. If the source is complete, the source is closed and the source is removed from the time list for processing (430). Next, a determination is made as to whether all sources are complete (432). If not, SP 400 goes to step 422. If all sources are complete, then SP 400 goes to step 434 and a summary of the results of the processing is printed. After step 434 is completed, the process ends (440).

Figure 5:
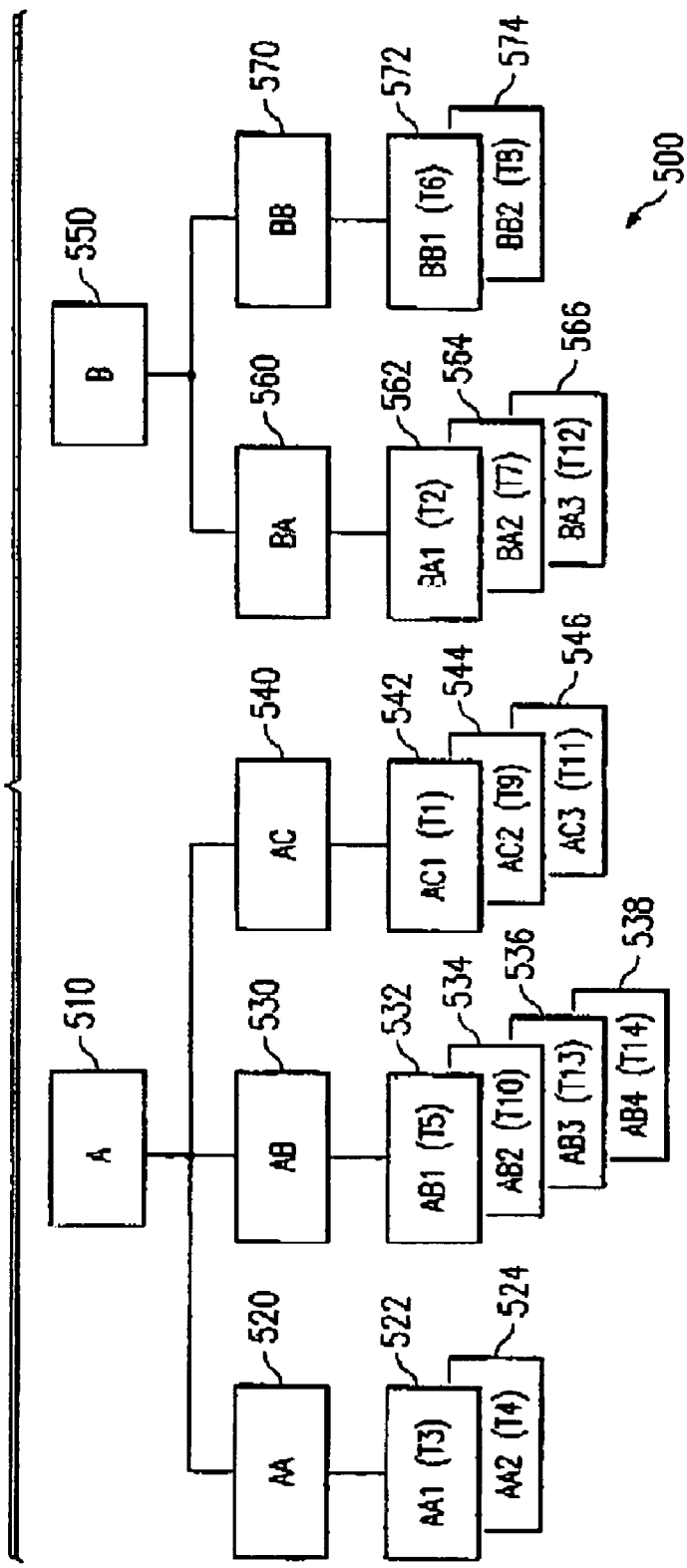
FIG. 5 is an exemplary representation of two data sources.

FIG. 5 represents data 500 to be processed by multiple analysis routines. Data 500 has source A 510 and source B 550. Source A has files AA 520, AB 530 and AC 540. Source B has files BA 560 and BB 570. Each file has one or more records created at a time T(x) where x is a numeral designating the time sequence of the record within data 500. For example, file AA has record AA1 with time value T3 and record AA2 with time value T4. Record AA1 is third in time sequence out of fourteen records in the data 500. The records are summarized in Table 1.

TABLE 1

| Reference No. | Time Value | Record | File | Source |
|---|---|---|---|---|
| 542 | T1 | AC1 | AB | A |
| 562 | T2 | BA1 | BA | B |
| 522 | T3 | AA1 | AA | A |
| 524 | T4 | AA2 | AA | A |
| 532 | T5 | AB1 | AB | A |
| 534 | T6 | AB2 | AB | A |
| 564 | T7 | BA2 | BA | B |
| 574 | T8 | BB2 | BB | B |
| 544 | T9 | AC2 | AC | A |
| 534 | T10 | AB2 | AB | A |
| 546 | T11 | AC3 | AD | A |
| 566 | T12 | BA3 | BA | B |
| 536 | T13 | BB3 | AB | A |
| 538 | T14 | AB4 | AB | A |

Figure 6:
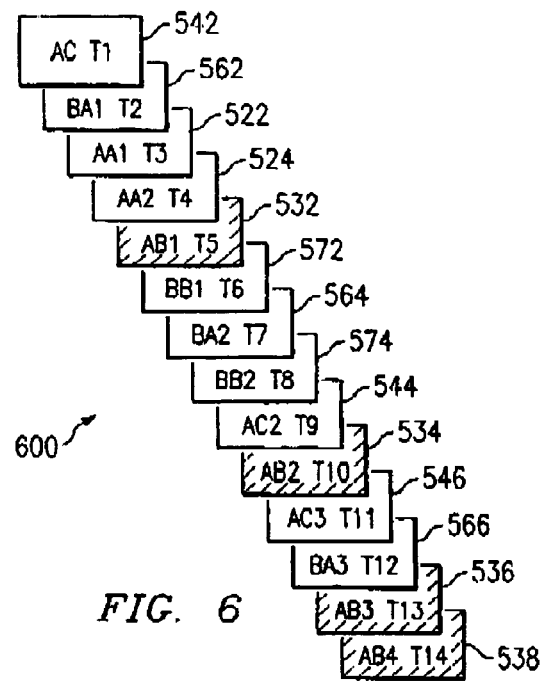
FIG. 6 depicts the records of the two data sources time ordered for analysis

FIG. 6 depicts a visual representation of the fourteen records of data 500 placed in time sequence. Records that do not meet the criteria for analysis routines are shaded and these records would not be examined.

It will be understood from the foregoing that various modifications and changes may be made in the preferred embodiment of the present invention by those skilled in the art without departing from its true spirit. It is intended that this description is for purposes of illustration only and should not be construed in a limiting sense. The scope of the invention should be limited only by the language of the following claims.

What is claimed:

1. A method for processing records from multiple source files, the method comprising:
   a computer receiving a data request comprising a time interval and a data type;
   the computer selecting records in the source files responsive to the data request;
   the computer placing the selected records in a common time order format; and
   the computer calling analysis routines to process the selected records in the common time order format;
   wherein the common time order format comprises a time index and a data value of the data type received in the data request.

2. The method of claim 1 further comprising:
   the computer summarizing the results of each analysis routine after all records have been analyzed.

3. The method of claim 1 further comprising:
   the computer storing control data for each analysis routine.

4. The method of claim 1 further comprising:
   the computer reading a source description.

5. The method of claim 1 wherein selecting records in the source files comprises:
   the computer calling a read routine to read the records in each source file, wherein each read routine comprises instructions for reading the format of the source file;
   the computer identifying each record in the source files responsive to the time interval in the data request; and
   the computer verifying that each identified record includes data responsive to the data type in the data request.

6. An apparatus for processing records from multiple source files, the apparatus comprising:
   a processor;
   a storage medium connected to the processor;
   a synchronization program residing in the storage medium; and
   source files residing in the storage medium;
   wherein the synchronization program is operable to cause the processor to
   receive a data request comprising a time interval and a data type;
   select records in the source files responsive to the data request;
   place the selected records in a common time order format; and
   call analysis routines to process the selected records in the common time order format;
   wherein the common time order format comprises a time index and a data value of the data type received in the data request.

7. The apparatus of claim 6 wherein the synchronization program further causes the processor to summarize the results of each analysis routine after all records have been analyzed.

8. The apparatus of claim 6 wherein the synchronization program further causes the processor to store control data for each analysis routine.

9. The apparatus of claim 6 wherein the synchronization program further causes the processor to read a source description.

10. The apparatus of claim 6 wherein the synchronization program further causes the processor to call a read routine to read the records in each source file, wherein each read routine comprises instructions for reading the format of the source file, identifying each record in the source files responsive to the time interval in the data request, and verifying that each identified record includes data responsive to the data type in the data request.

11. An apparatus for processing records from multiple source files, the apparatus comprising:
   one or more processors, one or more computer readable storage devices, and one or more computer readable memories;
   computer program instructions stored on at least one computer readable storage device for execution by at least one processor via at least one computer readable memory for receiving a data request comprising a time interval and a data type;
   computer program instructions stored on at least one computer readable storage device for execution by at least one processor via at least one computer readable memory for selecting records in the source files responsive to the data request;

computer program instructions stored on at least one computer readable storage device for execution by at least one processor via at least one computer readable memory for placing the selected records in a common format in time order; and computer program instructions stored on at least one computer readable storage device for execution by at least one processor via at least one computer readable memory for calling analysis routines to process the selected records in time order;

wherein the common time order format comprises a time index and a data value of the data type received in the data request.

12. The apparatus of claim 11 further comprising:
computer program instructions stored on at least one computer readable storage device for execution by at least one processor via at least one computer readable memory for summarizing the results of each analysis routine after all records have been analyzed.

13. The apparatus of claim 11 further comprising:
computer program instructions stored on at least one computer readable storage device for execution by at least one processor via at least one computer readable memory for storing control data for each analysis routine.

14. The apparatus of claim 11 further comprising:
computer program instructions stored on at least one computer readable storage device for execution by at least one processor via at least one computer readable memory for reading a source description.

15. The apparatus of claim 11 wherein the means for selecting records comprises:
computer program instructions stored on at least one computer readable storage device for execution by at least one processor via at least one computer readable memory for reading the records in each source file;

computer program instructions stored on at least one computer readable storage device for execution by at least one processor via at least one computer readable memory for identifying each record in the source files responsive to the time interval in the data request; and computer program instructions stored on at least one computer readable storage device for execution by at least one processor via at least one computer readable memory for verifying that each identified record includes data responsive to the data type in the data request.

16. The apparatus of claim 11 further comprising:
computer program instructions stored on at least one computer readable storage device for summarizing the results of each analysis routine after all records have been analyzed.

17. The apparatus of claim 11 further comprising:
computer program instructions stored on at least one computer readable storage device for storing control data for each analysis routine.

18. The apparatus of claim 11 further comprising:
computer program instructions stored on at least one computer readable storage device for reading a source description.

19. The apparatus of claim 11 wherein the means for selecting records comprises:
computer program instructions stored on at least one computer readable storage device for reading the records in each source file;

computer program instructions stored on at least one computer readable storage device for identifying each record in the source files responsive to the time interval in the data request; and computer program instructions stored on at least one computer readable storage device for verifying that each identified record includes data responsive to the data type in the data request.

20. A computer program product for processing records from multiple source files, the computer program product comprising:
one or more computer readable storage devices;
computer program instructions stored on at least one computer readable storage device for receiving a data request comprising a time interval and a data type;

computer program instructions stored on at least one computer readable storage device for selecting records in the source files responsive to the data request;

computer program instructions stored on at least one computer readable storage device for placing the selected records in a common format in time order; and computer program instructions stored on at least one computer readable storage device for calling analysis routines to process the selected records in time order;

wherein the common time order format comprises a time index and a data value of the data type received in the data request.

* * * * *